United States Patent
Eguchi et al.

(10) Patent No.: US 6,224,068 B1
(45) Date of Patent: May 1, 2001

(54) BAGGAGE PUSHCART CONFIGURED FOR NEGOTIATING ESCALATOR STAIRWAYS

(75) Inventors: Yasuhiko Eguchi; Toru Kakehi, both of Neyagawa; Heiji Fukutake, Toyonaka, all of (JP)

(73) Assignee: Exedy Corporation, Neyagawa (JP)

( * ) Notice: Subject to any disclaimer, the term of this patent is extended or adjusted under 35 U.S.C. 154(b) by 0 days.

(21) Appl. No.: 09/296,663

(22) Filed: Apr. 23, 1999

(30) Foreign Application Priority Data

Apr. 30, 1998 (JP) .................................................. 10-121077

(51) Int. Cl.$^7$ ....................................................... B62B 5/02
(52) U.S. Cl. ...................... 280/5.2; 280/5.26; 280/33.994
(58) Field of Search ............................ 280/38, 5.2, 5.26, 280/5.28, 33.994, 47.11, 33.991, 33.992, 98, 99; 180/8.2, 408, 409, 411; 16/35 R

(56) References Cited

U.S. PATENT DOCUMENTS

| | | | |
|---|---|---|---|
| 2,641,325 | * | 6/1953 | Hoffman et al. .......................... 180/8 |
| 2,799,514 | * | 7/1957 | Kramcsak, Jr. .......................... 280/29 |
| 3,827,718 | * | 8/1974 | Curry ............................. 280/242 WC |
| 4,381,870 | * | 5/1983 | Muellner ............................. 280/33.99 |
| 5,040,265 | | 8/1991 | France et al. ............................... 16/35 |
| 5,450,650 | * | 9/1995 | Bertrand et al. ....................... 16/35 R |
| 5,516,127 | * | 5/1996 | Glazer et al. .................... 280/33.994 |
| 5,560,626 | * | 10/1996 | Glazer et al. .................... 280/33.994 |
| 5,579,857 | * | 12/1996 | Abe et al. .............................. 180/8.2 |
| 5,797,611 | * | 8/1998 | Joseph et al. .................... 280/33.991 |
| 6,029,982 | * | 2/2000 | Kakehi et al. .......................... 280/5.2 |
| 6,112,843 | * | 9/2000 | Wilcox et al. ......................... 180/345 |
| 6,126,176 | * | 10/2000 | Eguchi et al. .......................... 280/5.2 |
| 6,131,936 | * | 10/2000 | Eguchi et al. ..................... 280/339.4 |

* cited by examiner

*Primary Examiner*—J. J. Swann
*Assistant Examiner*—J. Allen Shriver
(74) *Attorney, Agent, or Firm*—Shinjyu Intellectual Property Firm

(57) ABSTRACT

The present invention configures a pushcart, in particular a baggage cart such as is used in airports, for ease of maneuverability in negotiating an escalator stairway. The cart is fitted with a front wheel assembly and pivotable rear wheel assemblies, as well as with drop-attenuating mechanisms fitted to each wheel assembly. The rear wheel assemblies each include a reverse-releasable, pivoting-lock mechanism. The drop attenuating mechanisms function when the pivotable wheel assemblies are locked in the pushcart advancing direction, and include damped-swing traction members for establishing adhesive friction in contacting the treads of a sloping escalator stairway. The traction members bear the pushcart through a damped swing if the wheel assemblies are not riding on the treads of the escalator steps. The pushcart user can readily orient the vehicle toward an escalator by slightly backing up the cart, swinging it into the desired orientation, and then, by pushing the cart forward, the rear wheel assemblies automatically lock straight ahead. Thus, the wheel drop attenuators are able to function effectively to smooth the dropping of the pushcart in case the wheels are caught on the edges of the escalator stairway as it slopes.

4 Claims, 13 Drawing Sheets

BAGGAGE PUSHCART CONFIGURED FOR NEGOTIATING ESCALATOR STAIRWAYS

BACKGROUND OF THE INVENTION

1. Technical Field

The present invention relates to pushcarts for transporting baggage and the like; in particular the invention is directed to a baggage pushcart for use in airports, train stations, etc., maneuverable to negotiate an escalator stairway.

2. Description of Related Art

In large transportation centers, such as airports, handcarts or pushcarts are usually provided to assist with moving large suitcases, trunks, bags, etc. Passengers load their baggage on the carts and travel within the airport. Escalators are usually installed within airports, and users often ride the escalators with the carts loaded with their baggage.

The user of such a pushcart loaded with baggage confronts difficulties when boarding an escalator. Conventionally, pivotable caster wheels are employed on the cart, typically as the front wheel(s), and the rear wheels are fixed in the cart advancing direction to ensure that the cart moves straightforward. If available room on the way to the escalator is limited, the user may consequently find it difficult to maneuver the cart to board the escalator stairway. Further, once on board the escalator, the user has to be concerned with positioning the cart wheels centrally along the length of the escalator treads lest the cart drop when the moving stairway treads begin to slope, forming the escalator steps. With a heavily loaded cart, thus having to position the wheels can be a nuisance; worse than this bother is the danger should the cart drop if the wheels are caught on the edges of the formed escalator steps.

A separate consideration is that airport personnel who are charged with storing the baggage pushcarts join them together in long chains for transport to designated locations. Thus joining the carts, however, makes it very difficult to move the long chain sideways. Because the rear wheels are fixed in the advancing direction as noted above, the rear wheels of the joined carts must be skidded laterally.

SUMMARY OF THE INVENTION

Accordingly, an object of the present invention is to configure a pushcart, in particular a baggage cart such as is used in airports, for ease of maneuverability in negotiating an escalator stairway.

A further object is to enable the cart to travel straightforward securely and yet to be readily moved laterally as needed.

The present invention configures a pushcart, in particular a baggage cart such as is used in airports, for ease of maneuverability in negotiating an escalator stairway.

In accordance with the invention, in a principal embodiment, the cart comprises a cart body and a plurality of wheel assemblies carrying wheels. At least two of the wheel assemblies, for example two rear wheel assemblies, each includes a pivotable wheel mount that is attached to the cart body and holds a wheel. Thus, the two rear wheel assemblies are pivotable against the cart body for running the pushcart in lateral and advancing directions. Further, each rear wheel assembly includes a releasable pivoting-lock mechanism for releasably locking its pivotable wheel mount in the pushcart advancing direction.

Additionally, drop-attenuating mechanisms are fitted to each wheel assembly of the plurality, for example, to a front as well as to the two rear assemblies. The drop-attenuating mechanisms include damped-swing traction members disposed at a predetermined separation from level surfaces. With the pivotable wheel assemblies locked in the pushcart advancing direction, the damped-swing traction members establish adhesive friction in contacting the treads of a sloping escalator stairway. Accordingly, if the wheel assemblies are not riding on the treads of the escalator steps, that is, if the wheels are pitched off the edge of a forming step, the traction members bear the pushcart through a damped swing.

The two rear wheel assemblies each includes a fixed member fastened to the cart body. A swivel joins each pivotable wheel mount to the fixed member, such that the wheel mount is pivotable against the fixed member about a vertical axis.

The releasable pivoting-lock mechanism includes an engagement member mounted on the fixed member of each rear wheel assembly. Each engagement member has a rearward notch oriented along the pushcart advancing direction. Each releasable pivoting-lock mechanism also comprises a stop formed for engagement with the rearward notch in the engagement member, and a stop retainer. The stop retainer is fixed to the horizontal part of the wheel mount for retaining the stop in contact with the wheel.

Accordingly, when the pushcart is pushed in the advancing direction, the stop is urged by frictional contact with the wheel into engagement with the rearward notch. When the pushcart is reversed slightly against the advancing direction, the stop is urged out of engagement with the rearward notch by frictional contact with the wheel such that the wheel assembly is pivotable against the cart body.

Furthermore, the drop attenuating mechanisms comprise damping means connected to the traction members. The damping means are configured for damping the traction members through a swing approximately equal to the specification slope of the escalator.

The user of a fully loaded cart embodied as described above can readily orient the vehicle toward an escalator by slightly backing up the cart reverse to its advancing direction and swinging the cart into the desired orientation. Then, by pushing the cart in its advancing direction toward the escalator, the rear wheel assemblies automatically lock straight ahead. In the principal embodiment, the front wheel assembly is fixed in the advancing direction, and with the rear wheel assemblies locked straight, the front- and rear-wheel drop attenuators are able to function effectively. The user of the cart can then board the escalator without concern for the back-and-forth cart positioning with respect to the treads of the escalator stairway. Even if the cart is brought to a stop with the wheel assemblies riding on the between-step breaks in the flat way before the stairway begins to slope, the user need not reposition the cart. If the tires and are caught on the edges of the sloping stairway, the front- and rear-wheel drop attenuators—the latter being secured into functioning position by the locking mechanisms—will smooth the dropping of the cart, either ascending or descending. Users of a pushcart embodied in accordance the present invention should especially welcome its inventive capabilities wherein the cart is heavily loaded with baggage.

The foregoing and other objects, features, aspects and advantages of the present invention will become more apparent from the following detailed description in conjunction with the accompanying drawings.

DETAILED DESCRIPTION OF THE PREFERRED EMBODIMENT

Figure 1:
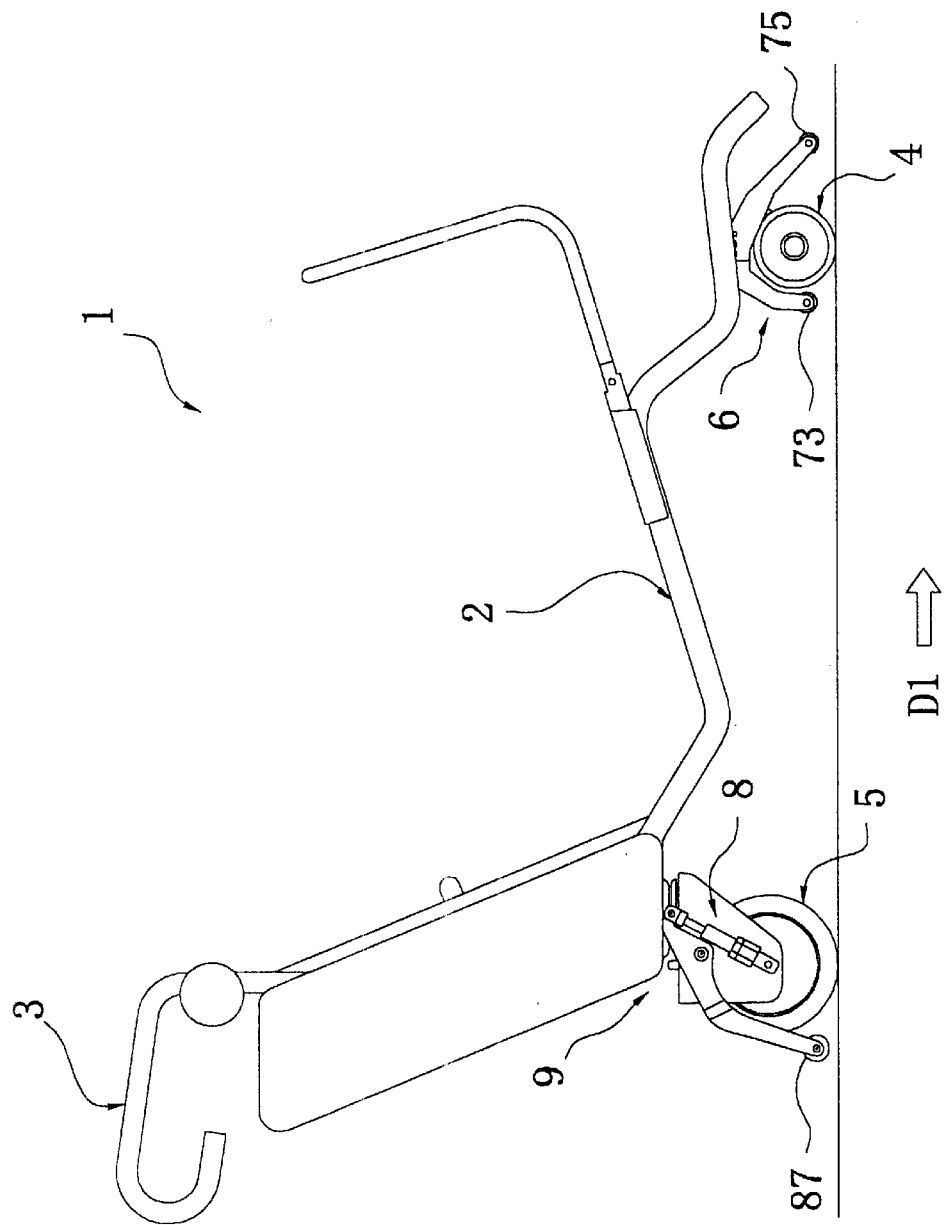
FIG. 1 is a side elevational view of a cart in accordance with one embodiment of the present invention.

FIG. 1 illustrates an airport cart as an embodiment of the present invention. The cart 1 is used at an airport for carrying and transporting baggage such as suitcases. The cart 1 is primarily composed of a cart body 2, a handle 3, a front wheel assembly 4, two rear wheel assemblies 5, a front-wheel drop attenuator 6, a rear-wheel drop attenuator 8, lock mechanisms 9 fitted to each of the rear wheel assemblies 5, and a (not shown) brake mechanism.

Arrow D1 in FIG. 1 indicates the forward moving (advancing) direction of the cart 1. In the following description, "longitudinal" and "lateral" are directions defined relative to the advancing direction D1. Specifically, "lateral" indicates horizontal directions generally perpendicular to the direction D1 and "longitudinal" indicates horizontal directions generally parallel to the direction D1.

The longitudinal distance between the front and rear wheel assemblies 4 and 5 (that is, the wheelbase) is, in this example, 800 mm, and is on the order of double the tread length of escalator steps. The lateral distance between the two rear wheel assemblies 5 (that is, the wheel track) is 600 mm, and the entire length of the cart 1 including the handle 3 is 1300 mm. The cart 1 is designed for a specification 25° escalator, for example.

Figure 2:
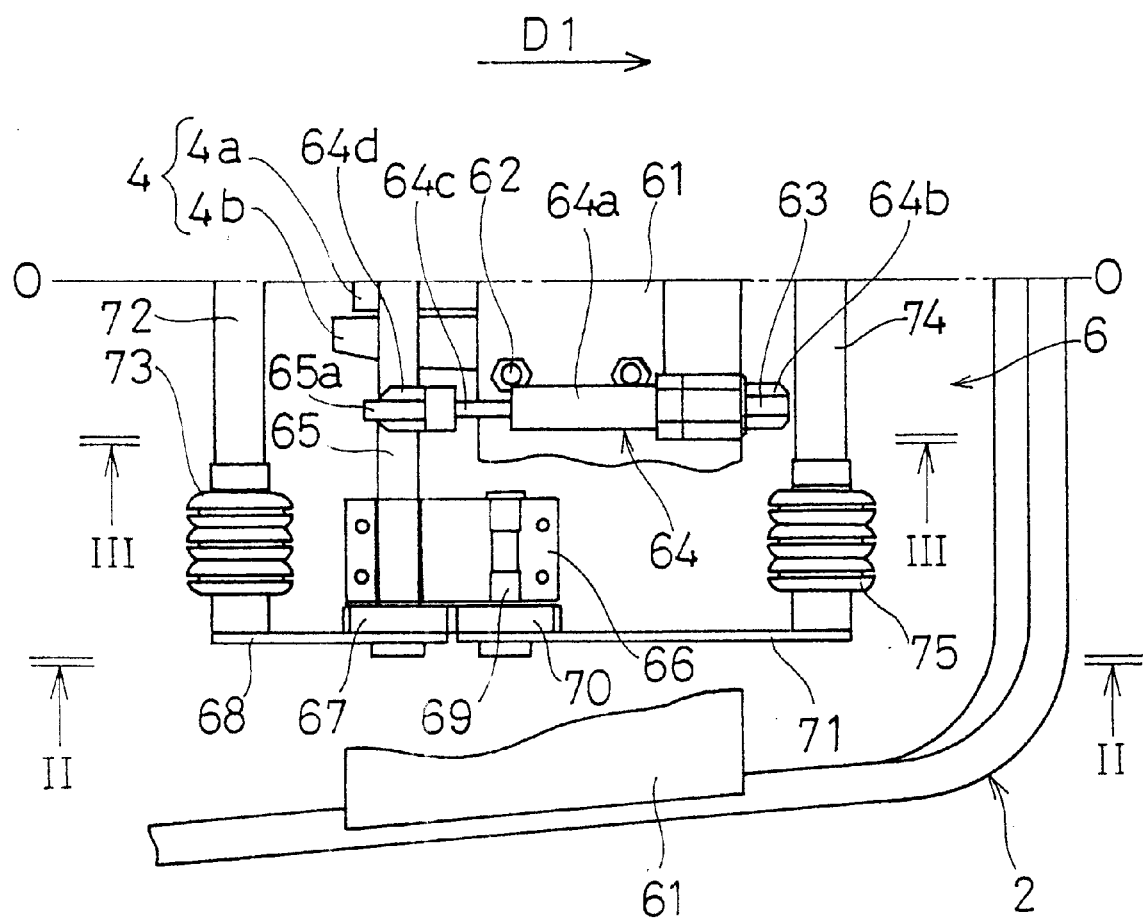
FIG. 2 is a fragmentary, cutaway, overhead view of the right front half of the cart, as split along a line of symmetry O—O, therein illustrating a front-wheel drop attenuator.
Figure 4:
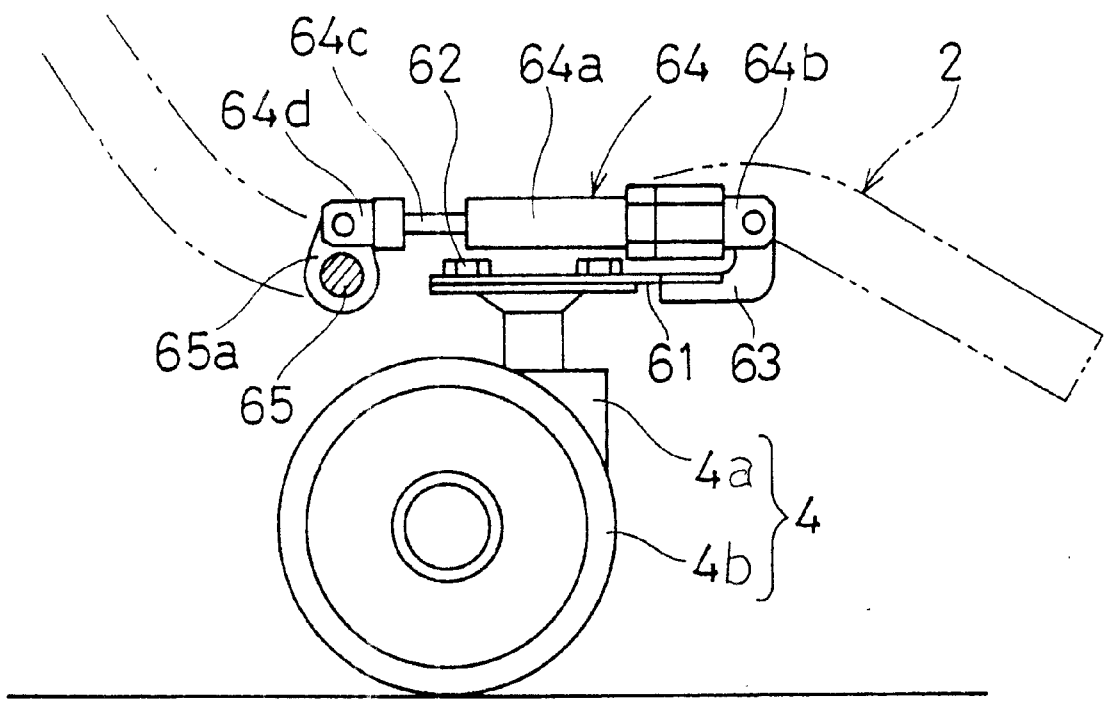
FIG. 4 is a view of the front wheel assembly including a piston mechanism of the front-wheel drop attenuator, with the cart frame indicated in phantom, seen in the direction of the arrows IV in FIG. 2.

As shown in FIGS. 2 and 4, the front wheel assembly 4 is a double caster construction, and more specifically is composed of a fixed portion 4a and two tires 4b. The front wheel assembly 4 is carried on a support plate 61, which is described in greater detail below, and is pivotable around a vertical axis with respect to the cart body 2.

Figure 3:
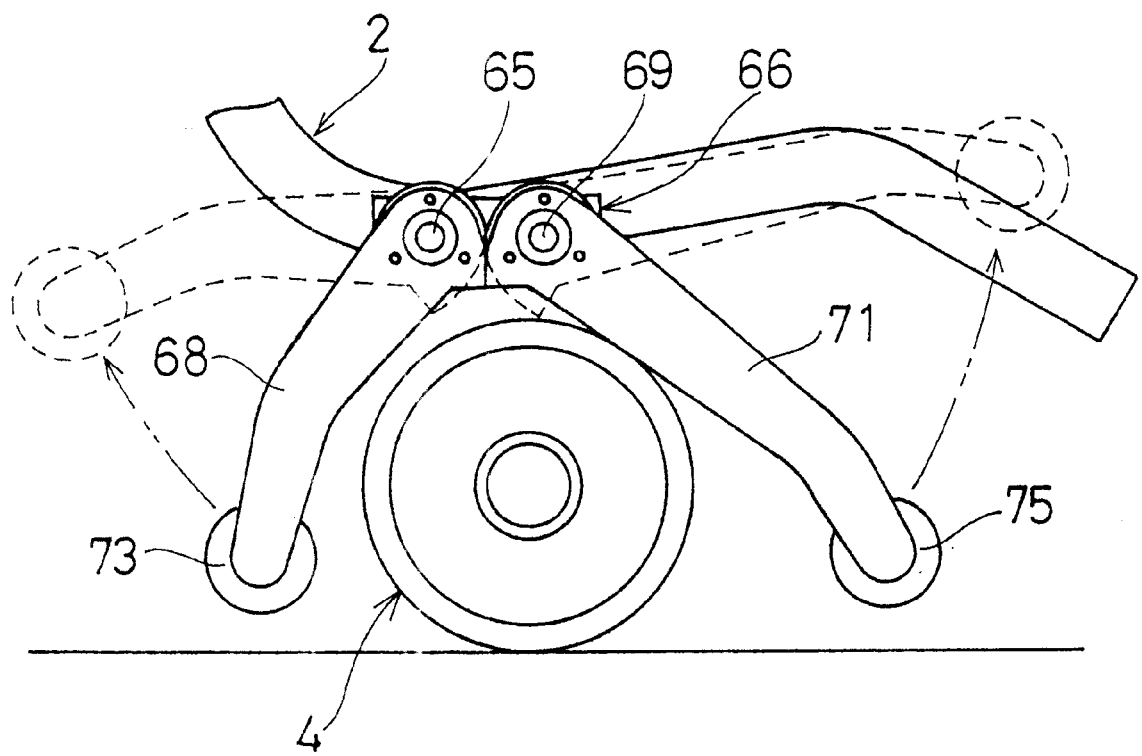
FIG. 3 is a view of the front-wheel drop attenuator and the front wheel with which it is associated, seen in the direction of the arrows III in FIG. 2 on a fragment of the cart frame.

The front-wheel drop attenuator 6 chiefly comprises, as shown in FIGS. 2–4, the support plate 61, two first oil dampers 64, a first shaft 65, first and second arms 68 and 71, and first and second traction members 73 and 75.

The support plate 61 is fixed at opposing ends to the front portion of the cart body 2. The front wheel assembly 4 is disposed under the center (indicated by the dashed line O—O in FIG. 2) of the support plate 61. The fixed portion 4a of the front wheel assembly 4 is fastened to the support plate 61 by bolts 62. The support plate 61 is furnished with two coupling plates 63 symmetrically about the center axis O—O and extending from the front end of the support plate 61 near its center. The coupling plates 63 are provided with pin-receiving holes.

Two first oil dampers 64 are provided symmetrically on either side of the center O—O. Each first oil damper 64 chiefly comprises a cylinder 64a, a cylinder-end joint 64b, a piston 64c, and a piston-end joint 64d. The cylinder-end joint 64b is fixed to the forward end, in the advancing direction D1, of the cylinder 64a, and is joined to the coupling plate 63 via a pin. The piston-end joint 64d is fixed to the rear end, in the advancing direction D1, of the piston 64c, and is joined to a coupling plate 65a, described below.

A first shaft 65 is rotatably supported at either end by shaft carrying members 66. The shaft carrying members 66 are fixed to the bottom surface of the support plate 61. As shown in FIGS. 2 and 4, two coupling plates 65a are non-rotatably fixed to the first shaft 65 symmetrically about the center axis O—O, extending upward. Holes for pin engagement with the piston-end joint 64d of the first oil damper 64 are formed in the upper portion of the coupling plates 65a, in a position offset from the center of the first shaft 65. A first gear 67 and a first arm 68 are fixed to opposite end portions of the first shaft 65 further outward than the shaft support member 66.

Figure 11:
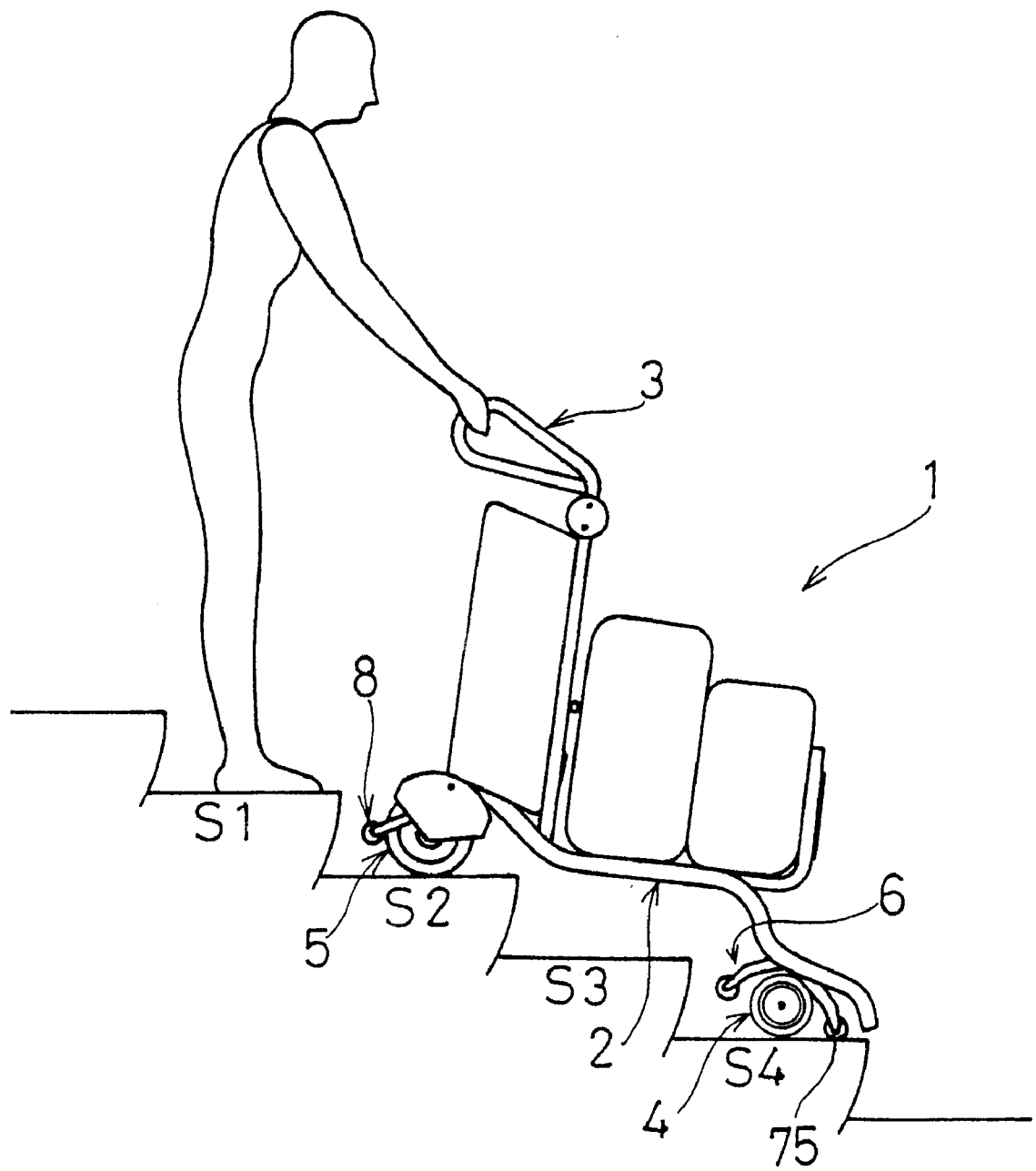
FIG. 11 schematically illustrates a user and the cart loaded with baggage, riding the stairway of a descending escalator.
Figure 15:
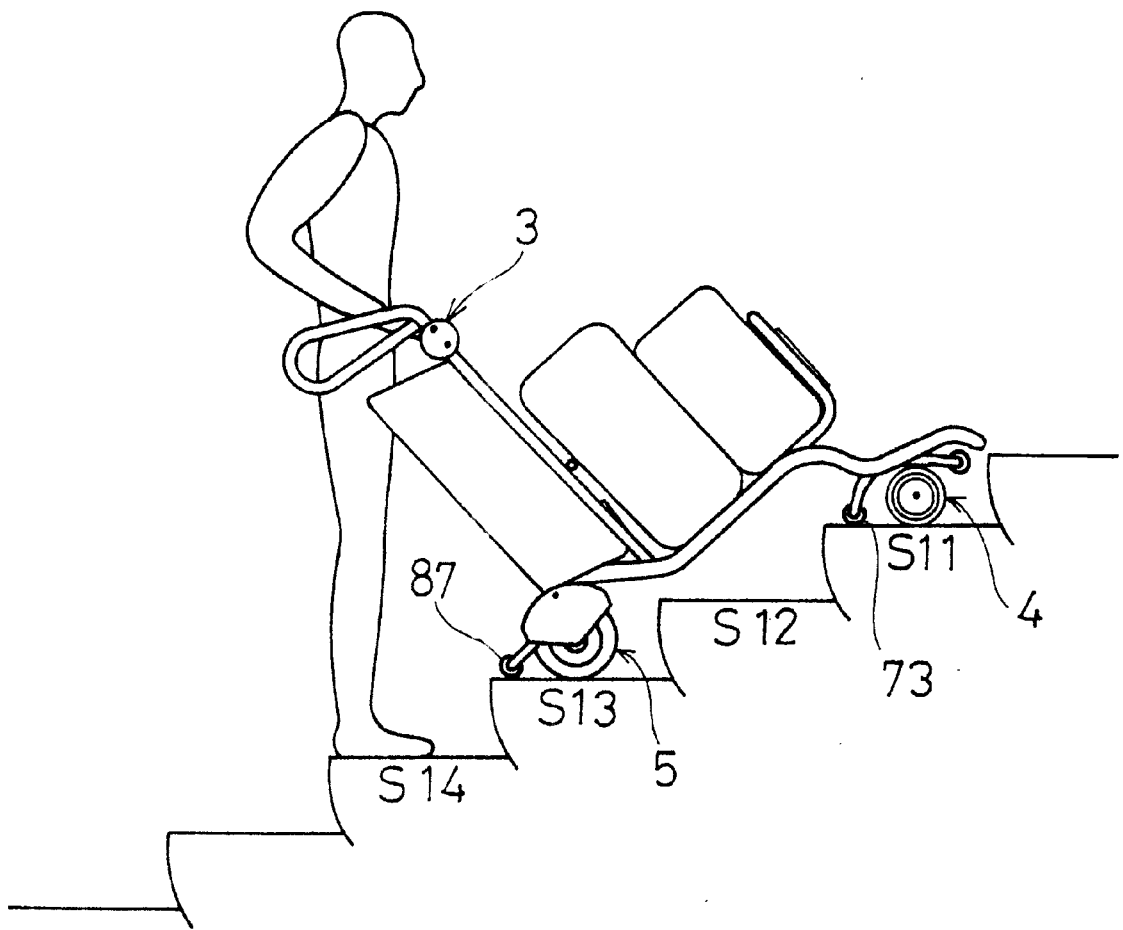
FIG. 15 schematically illustrates a user and the cart loaded with baggage, riding the stairway of an ascending escalator.

The first arms 68 are fixed at one end to the ends of the first shaft 65, and, as shown in FIG. 3, extend to a position behind the front wheel assembly 4. A third shaft 72 joins together the other ends of the left and right first arms 68 (with respect to a user in the position of normal cart operation, as depicted in FIGS. 11 and 15), and is rotatably supported on both first arms 68. The third shaft 72, near either of the right and left ends, is fitted with the first traction members 73, which are made of rubber or the like.

Each first traction member 73 has a larger outer diameter than the third shaft 72. As shown in FIG. 3, the lower end of the first traction member 73 is positioned slightly higher than the lower end of the front wheel assembly 4 when the front wheel assembly 4 is grounded on a floor surface.

The second arms 71 are fixed at one end to a second shaft 69, and, as shown in FIG. 3, extend forward of the front wheel assembly 4. The second shaft 69 is supported by the shaft support member 66. A second gear 70 is fixed to the second shaft 69, and meshes with the first gear 67, as indicated in FIGS. 2 and 3.

Accordingly, when the first arm 68 travels describing an arc with its center about the first shaft 65, the first shaft 65 rotates; the rotation is transmitted via the first and second gears 67 and 70; the second shaft 69 rotates; and the second arm 71 travels describing an arc with its center about the second shaft 69. An example following this travel is indicated by the dotted line in FIG. 3. Note that the arc described by either the first and second arms 68 and 71 should be approximately the specification slope of the escalator.

Conversely, when the second arm 71 travels describing an arc with its center about the second shaft 69, the second shaft 69 rotates; the rotation is transmitted via the first and second gears 67 and 70; the first shaft 65 rotates; and the first arm 68 travels describing an arc with its center about the first shaft 65.

A fourth shaft 74 joins together the other ends of the left and right second arms 71, and is rotatably supported on the first arms 71. The fourth shaft 74, near either end, is fitted with the second traction members 75, which are made of rubber or the like.

Each second traction member 75 has a larger outer diameter than the fourth shaft 74. As shown in FIG. 3, the lower end of the second traction member 75 is positioned slightly higher than the lower end of the front wheel assembly 4 when the front wheel assembly 4 is grounded on a floor surface.

When the first and second arms 68 and 71 spread from the state indicated by solid lines to the state indicated by dotted lines in FIG. 3, the first shaft 65 rotates, and the point of engagement of the coupling plate 65a and the piston-end joint 64d moves forward as well as downward. This inclines the first oil damper 64 toward the vertical, at the same time the piston 64c and the cylinder 64a move relatively. Therein, the piston 64c and the cylinder 64a undergo resistance while moving relative to each other, and therefore the turning speed of the first shaft 65, and in turn the moving speed of the first and second arms 68 and 71, is damped.

One each of the rear wheel assemblies 5 is provided on either of the right and left sides of the cart 1. As indicated in FIGS. 5–10, each rear wheel assembly 5 includes a stationary plate (fixed member) 51, a wheel mount 52, a fifth shaft 53 (wheel support device), a tire 54 (wheel) and a lock mechanism 9.

The stationary plate 51 is fastened to the rear portion of the cart body 2. The wheel mount 52 chiefly comprises a horizontal plate 52a, a first flanking plate 52b and a second flanking plate 52c.

The horizontal plate 52a is disposed beneath the stationary plate 51, wherein it is supported to be pivotable against the stationary plate 51 around a vertical shaft. The first flanking plate 52b extends downward from the outer edge of the horizontal plate 52a (the facing side in the FIG. 6 view), and the second flanking plate 52c extends downward from the inner edge of the horizontal plate 52a (the side opposite in the FIG. 6 view—shown in the cutaway). The lower ends of the first and second flanking plates 52b and 52c are provided respectively with round apertures, in which the fifth shaft 53 is rotatably supported.

The lock mechanism 9 is configured to restrict the wheel mount 52 from pivoting relative to the stationary plate 51 when the cart 1 is traveling in the advancing direction D1, and to release the restriction on the wheel mount 52 from pivoting relative to the stationary plate 51 when the cart 1 is moves opposite to the advancing direction D1. The lock mechanism 9 has an engage plate (engagement member) 91, a stop 92 and a stop retainer 94.

The engage plate 91 is supported to be non-rotatable on the fixed portion 51. An arcuate notch 91a is formed in the rear edge of the engage plate 91, as shown in FIGS. 5 and 7–9.

The stop 92 is composed of columnar lock, retained and contact portions 92a, 92b and 92c, respectively, which are coaxial and of different diameters. The lock portion 92a penetrates oblong hole 93a (described later). Therein, the lock portion 92a can be caught into the notch 91a (the state in FIGS. 5 and 6), into locking engagement with the engage plate 91. The retained portion 92b is held within the stop retainer 94 (also described later), and is of larger diameter than, and is disposed between, the lock and contact portions 92a and 92c. The contact portion 92c extends downward from the retained portion 92b, and its lower surface in contact with the tire 54.

The stop holding member (stop retainer) 94 is attached to the lower surface of the horizontal plate 52a of the wheel mount 52, and holds the lower surface of the retained portion 92b of the stop 92. An oblong hole 94a is formed in the stop retainer 94, and the contact portion 92c of the stop 92 penetrates the oblong hole 94a. The oblong hole 94a is an opening lengthened in the rotational direction of the tire 54—that is, in the direction orthogonal to the fifth shaft 53—and its width is about equal to the diameter of the contact portion 92c. Consequently, being that the contact portion 92c cannot move against the oblong aperture 94a in the direction along the fifth shaft 53, the stop 92 cannot move against the stop retainer 94 and the wheel mount 52 in the direction along the fifth shaft 53. Nevertheless, because the contact portion 92c is movable along the lengthwise direction of the oblong hole 94a, the stop 92 can move just a predetermined distance along the rotational direction of the tire 54 (the direction orthogonal to the fifth shaft 53).

Figure 5:
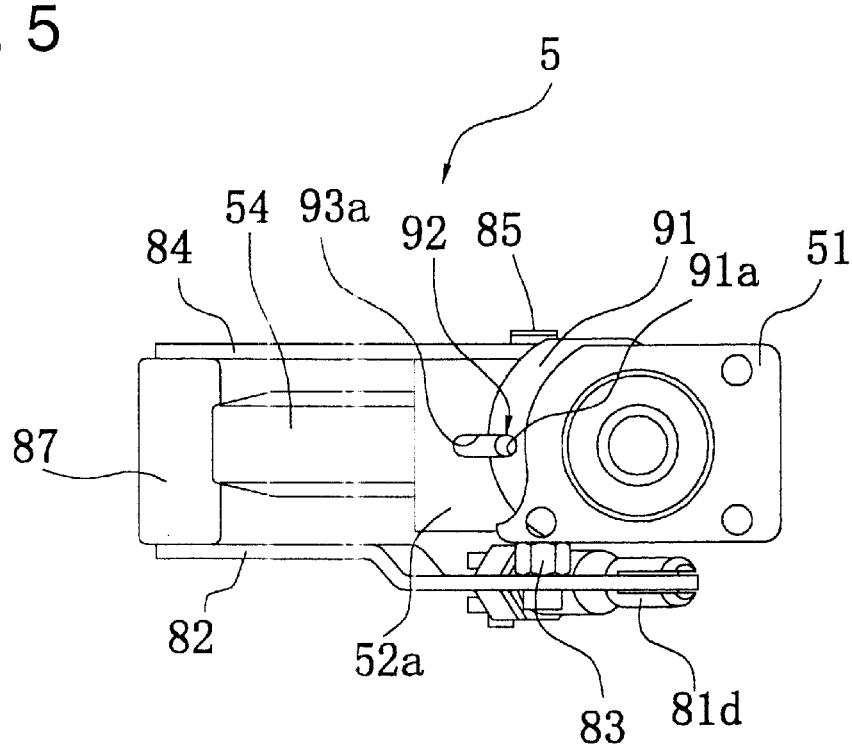
FIG. 5 is an overhead view of a rear wheel assembly shown off the cart, including a wheel lock mechanism in combination with a rear-wheel drop attenuator.
Figure 7:
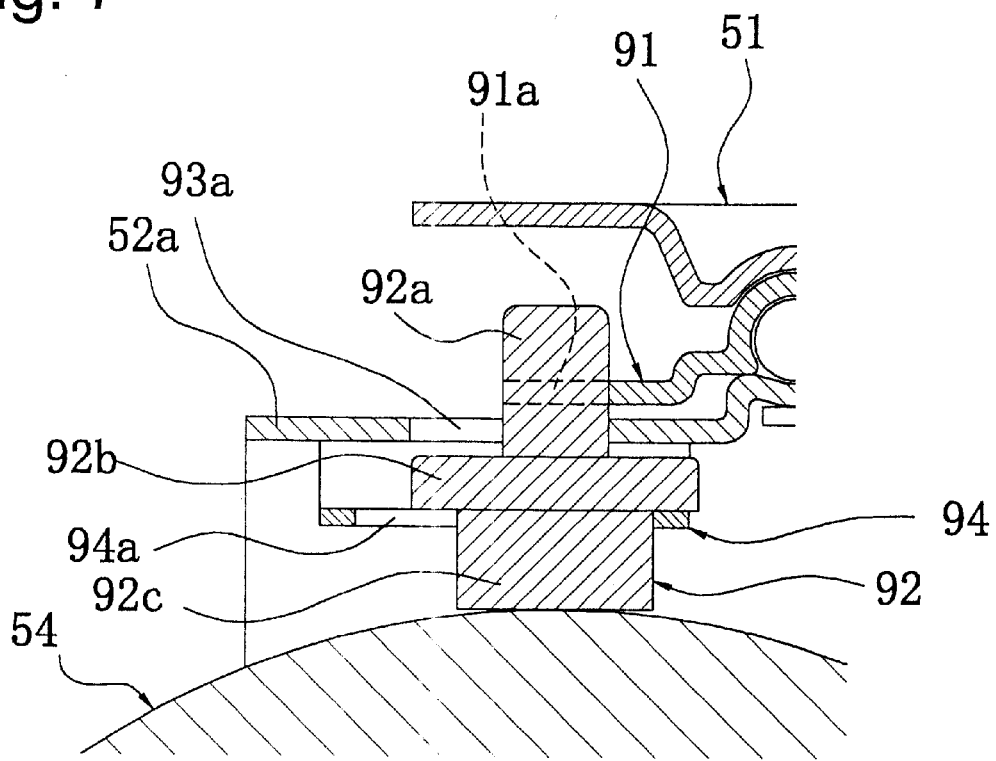
FIG. 7 is a fragmentary, enlarged-scale sectional view depicting details of the rear wheel assembly lock mechanism.
Figure 8:
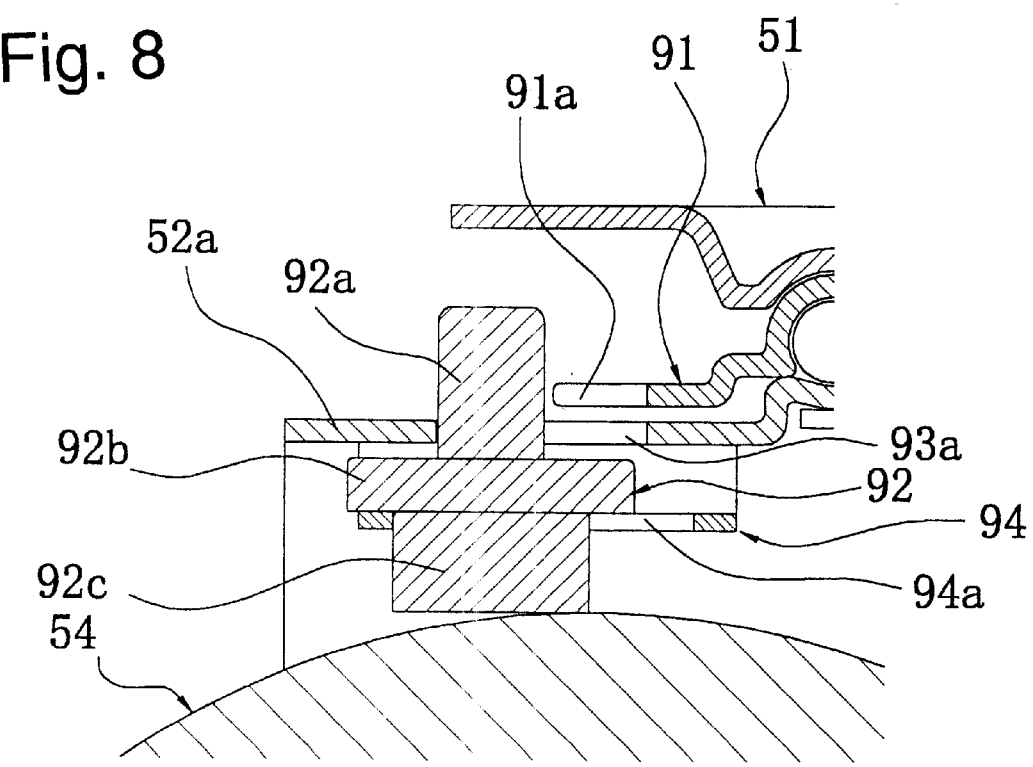
FIG. 8 is a fragmentary, enlarged-scale sectional view corresponding to FIG. 7.

As shown in FIGS. 5, 7 and 8, the above-mentioned oblong hole (stop holder) 93a is formed in the horizontal plate 52a of the wheel mount 52. The oblong hole 93a is an opening lengthened in the rotational direction of the tire 54—that is, in the direction orthogonal to the fifth shaft 53. Because the lock portion 92a of the stop 92 penetrates the oblong hole 93a, the stop 92 is essentially immobile in the direction against the wheel mount 52, along the fifth shaft 53.

Figure 6:
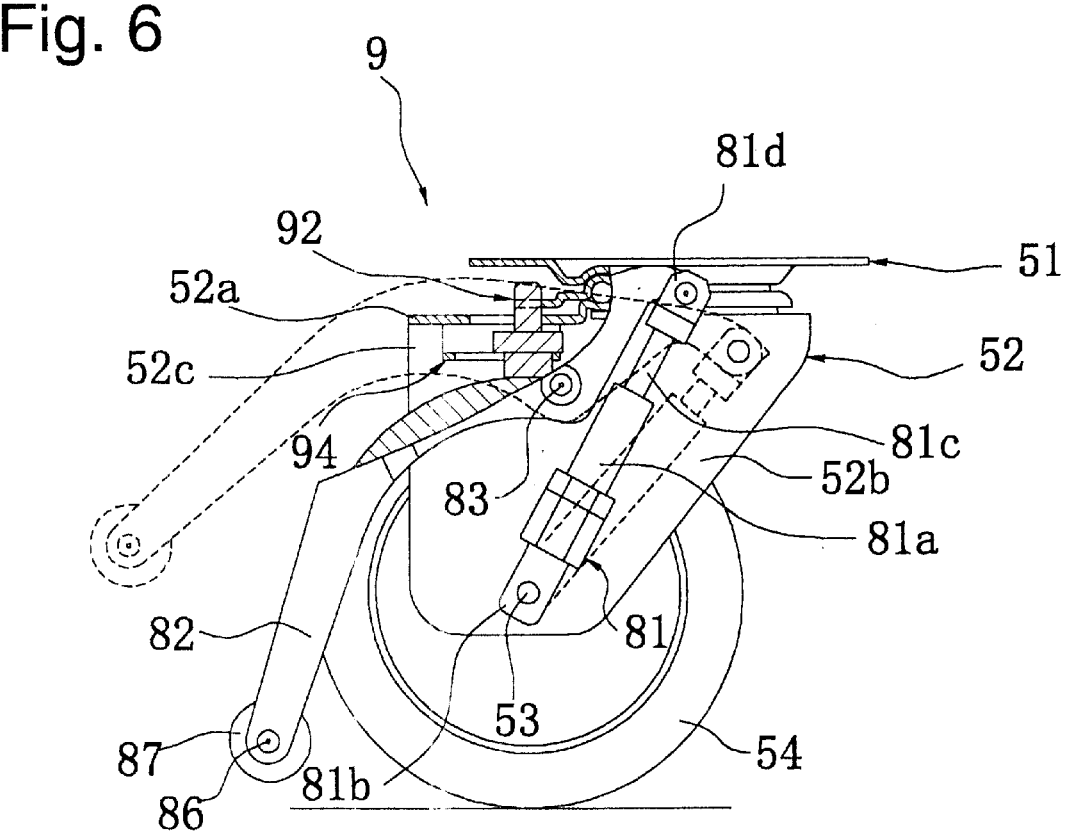
FIG. 6 is a cutaway, partly in section, side elevational view of the FIG. 5 rear wheel assembly including the wheel lock mechanism in combination with the rear-wheel drop attenuator.

As shown in FIGS. 5 and 6, the rear-wheel drop attenuator 8 primarily comprises second oil dampers 81, third outer arms 82, third inner arms 84 and third traction members 87.

Each second oil damper 81 is composed chiefly of a cylinder 81a, a cylinder-end joint 81b, a piston 81c and a piston-end joint 81d. The cylinder-end joint 81b is fixed to the lower end of the cylinder 81a, and is rotatably coupled to a portion of the fifth shaft 53 outside the first flanking plate 52b. One end of the piston 81c is fitted onto the piston-end joint 81d, and is in pin engagement with the upper end of the third outer arm 82.

One end of each third outer arm 82 is in pin engagement with the piston-end joint 81d, and, as shown in FIG. 5, extends from there rearward (leftward in FIG. 5) of the rear wheel assembly 5. The other end of the third outer arm 82 carries an end of a sixth shaft 86 (referring to FIG. 6).

Each third outer arm 82, between either end (in a location toward its engagement with the piston-end joint 81d), is rotatably supported on the first flanking plate 52b by a pin 83. Therefore, the second outer arm 82 is rotatable about the pin 83 as its center.

Each third inner arm 84, as shown in FIG. 5, is rotatably supported on the second flanking plate 52c by a pin 85 in a location equivalent to the height position and back-and-forth position of the pin 83. The other end of the third inner arm 84 carries an end of the sixth shaft 86.

The sixth shaft 86 joins together the ends of third outer arm 82 and the third inner arm 84, wherein it extends horizontally right/leftward. The central portion of the sixth shaft 86 is fitted with the third traction member 87, which is made of rubber or the like.

As shown in FIG. 6, the third traction member 87 is positioned slightly higher than the lower end of the rear wheel assembly 5 when the front wheel assembly 5 is grounded on a floor surface.

The third outer arm 82 and the third inner arm 84 can travel from the situation indicated by solid lines in FIG. 6 to that indicated by dotted lines. This travel describes an arc that is approximately the specification slope of the escalator. In thus moving, the point of engagement of the third outer arm 82 and the piston-side joint 81d travels forward as well as downward. This inclines the second oil damper 81, and at the same time the piston 81c and the cylinder 81a move relatively and are compressed. Therein, the piston 81c and the cylinder 81a undergo resistance while moving relative to each other, and therefore the travelling speed of the point of engagement of the third outer arm 82 and the piston-side joint 81d, and in turn the moving speed of the third traction member 87, is damped.

A description of the operation of the cart follows.

When the cart 1 is run straight, an operator (user) grips the handle 3 and pushes the entire cart 1 in the advancing direction D1. Doing so orients each rear wheel assembly 5 along the advancing direction D1, wherein, as shown in FIGS. 5, 6 and 7, the front portion of the oblong hole 93a and the recess 91a coincide superficially. The contact portion 92c, contacting the outer peripheral surface of the tire 54, receives a force in accordance with rotation of the tire 54, moving the stop 92 forward (in the advancing direction D1), engaging the lock portion 92a of the stop 92 with the notch 91a of the engage plate 91. Thereby, via the lock portion 92a, the engage plate 91 and the horizontal plate 52a of the wheel mount 52 (referring to FIG. 5) are made mutually non-rotatable, such that the wheel mount 52 and the wheel 54 cannot turn relative to the stationary plate 51 fixed to the cart body 2. In other words, in running the cart 1 straight, the orientation of the tire 54 is fixed by the lock mechanism 9, securing the straight forwardness of the cart 1.

Figure 9:
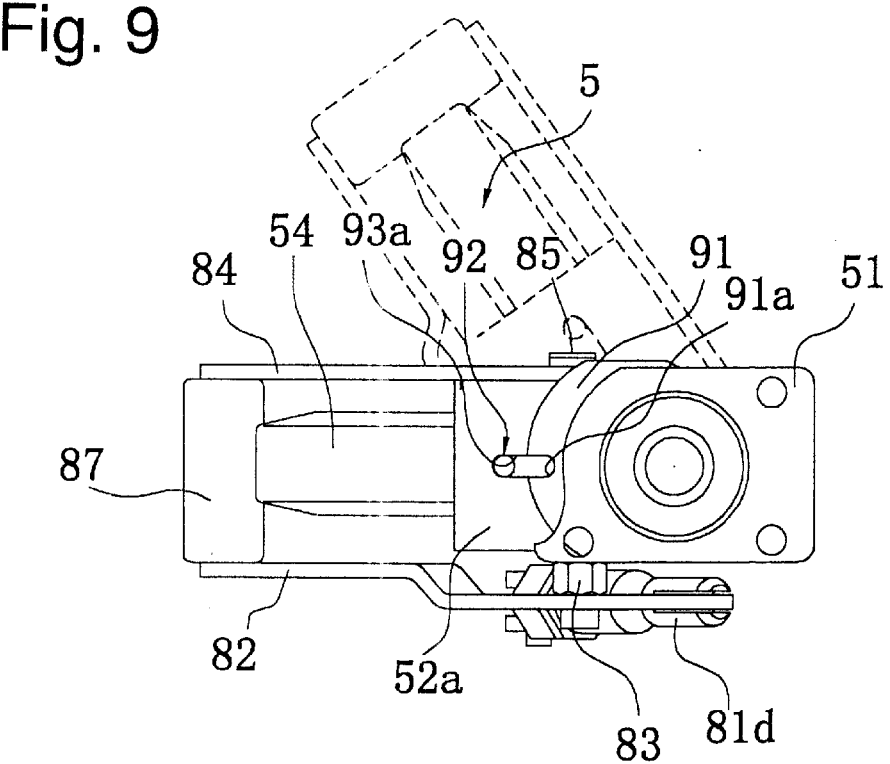
FIG. 9 is an overhead view corresponding to FIG. 5.
Figure 10:
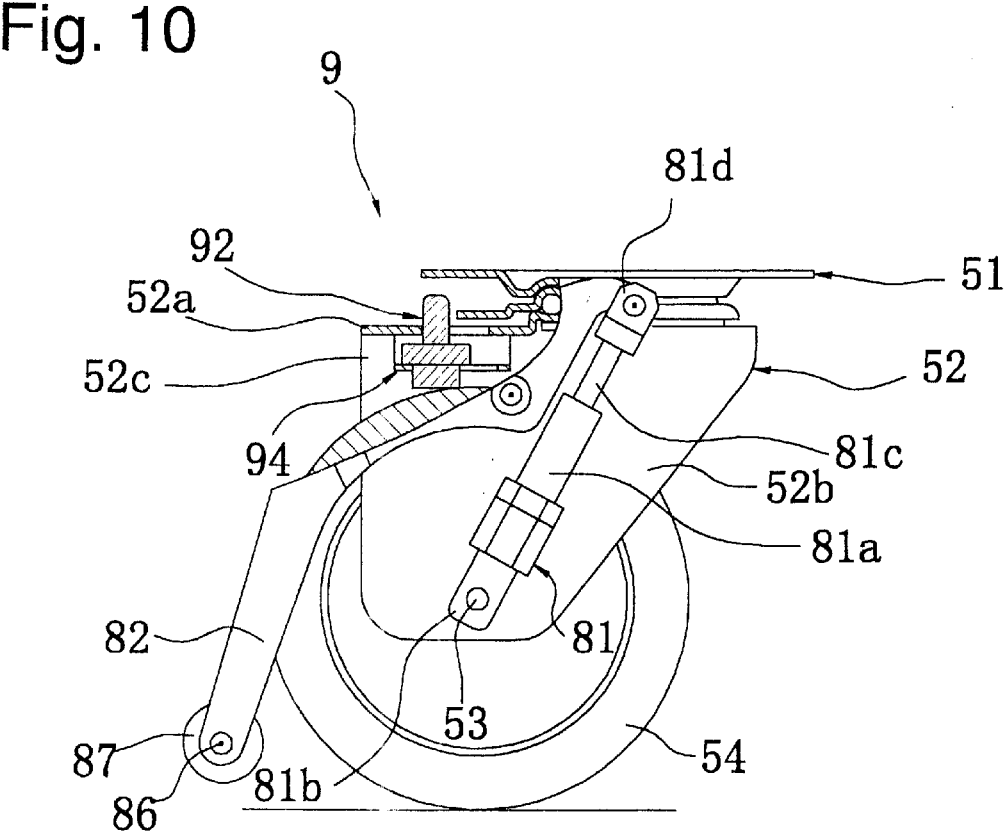
FIG. 10 is a cutaway, partly in section, side elevational view corresponding to FIG. 6.

When the user desires to move the cart 1 laterally (in directions orthogonal to or crossing the advancing direction D1), the tire 54 fixed by the lock mechanism 9 from pivoting relative to the cart body 2 is released. Concretely, the user brings the cart 1 to a stop, and moves the cart 1 slightly in a direction opposite to the advancing direction D1. Doing so rotates the tire 54 reverse to the advancing direction D1, shifting the contact portion 92c of the stop 92 rearward in accordance with the rotation of the tire 54, and bringing the lock portion 92a of the stop 92 out of the notch 91a in the engage plate 91 (FIGS. 8, 9 and 10). Accordingly, the rotational locking engagement of the stop 92 and the notch 91a in the engage plate 91, mutually non-rotatable against the stationary plate 51, is released. That is, the check on relative rotation between the wheel mount 52 and the stationary plate 51 is released, such that the orientation of the tire 54 with respect to the cart body 2 can be changed. Accordingly, by thereafter applying a lateral force to the cart 1, the user can change the orientation of the tire 54, as for example indicated by the dotted lines in FIG. 9, and move the cart 1 sideways.

A description of running the cart 1 on a descending escalator follows.

On a descending escalator, in the situation as shown in FIG. 11, when the front and rear wheel assemblies 4 and 5 are riding steps S2 and S4, rotation of the rear wheel assemblies 5 is checked by operating a not-shown brake mechanism, which keeps the cart 1 from slipping back-and-forth. That is, in the situation shown in FIG. 11, the cart 1, without dropping, is carried by the escalator. When the front and rear wheel assemblies 4 and 5 are riding on the middle portions tread-lengthwise of the steps S2 and S4 as shown in FIG. 11, the second traction member 75 is grounded on the frontward portion of the step S4 on which the front wheel assembly 4 is riding, supplementing the check on back-and-forth shifting of the cart 1.

Figure 12:
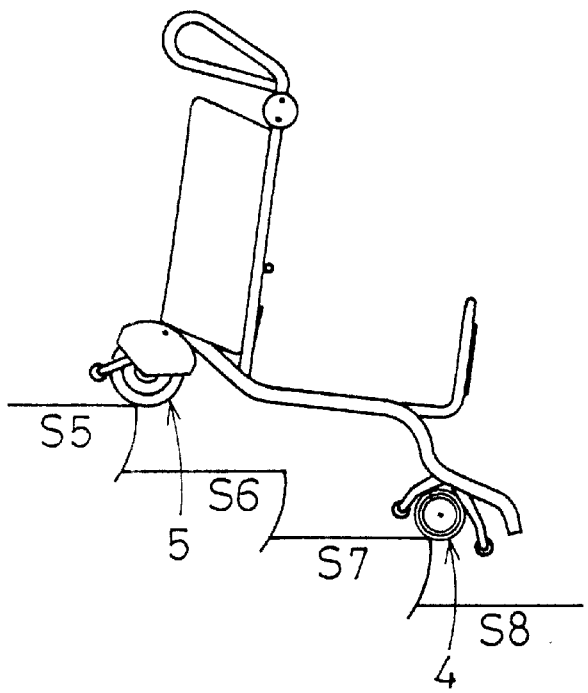
FIGS. 12–14 depict the cart alone on the descending escalator stairway, illustrating stages of the action of the front- and rear-wheel drop attenuators.
Figure 13:
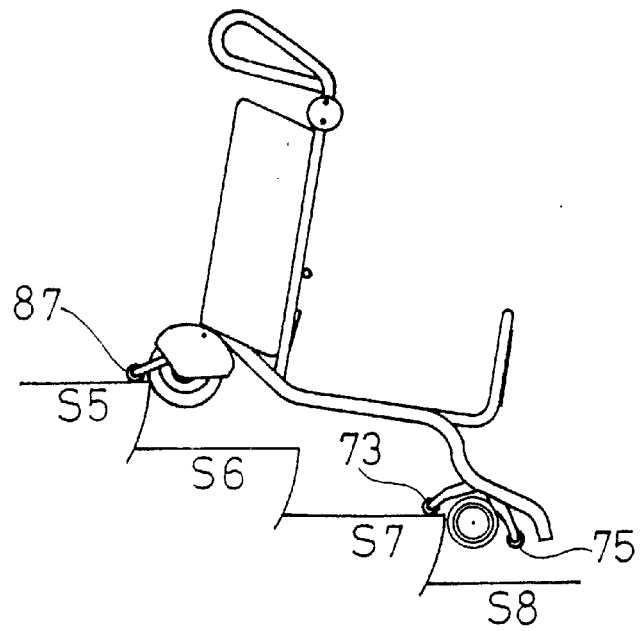
Figure 14:
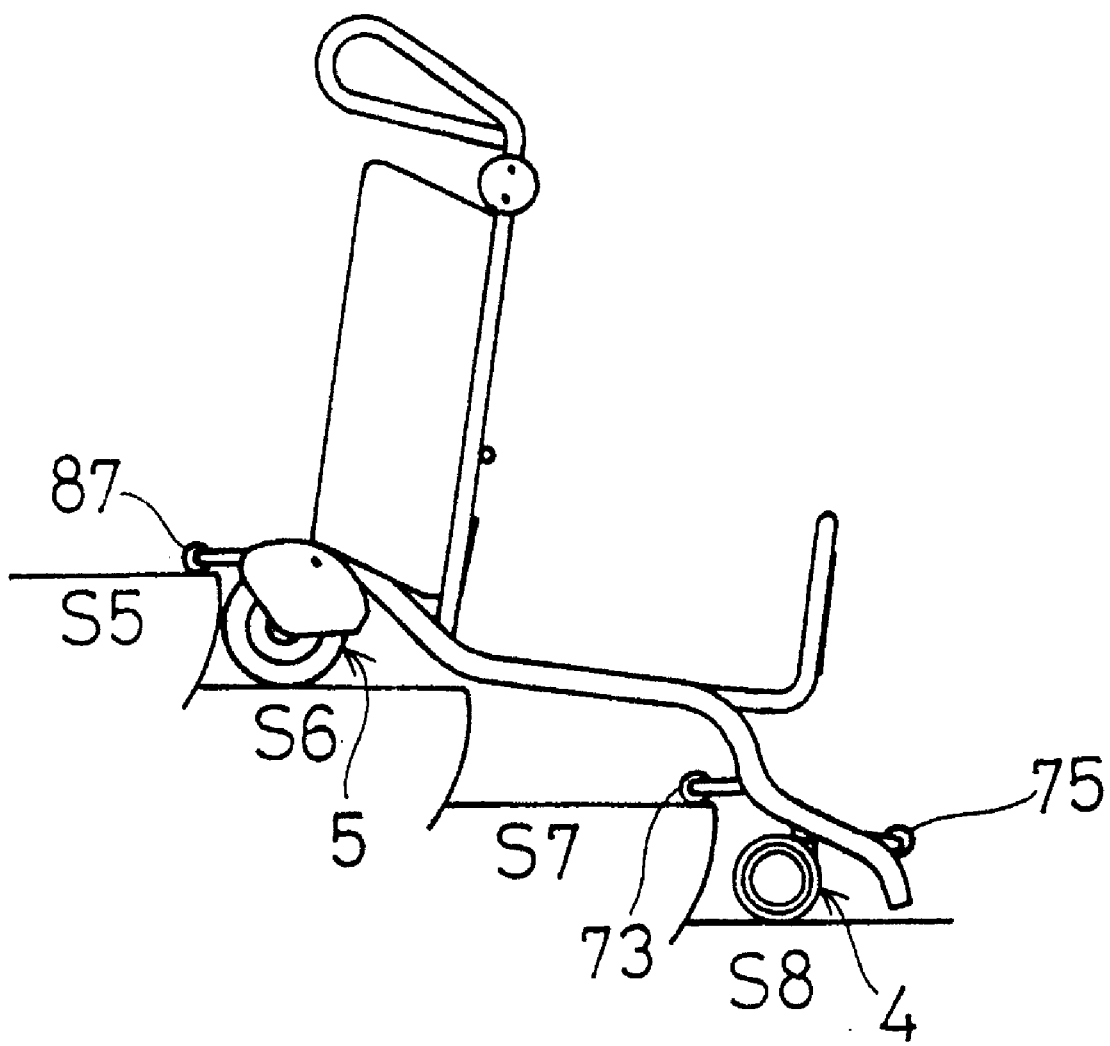

In boarding a descending escalator wherein the front and rear wheel assemblies 4 and 5 are riding near the step-to-step breaks, when the escalator slopes, the cart 1 is brought into a situation as shown in FIG. 12. The cart 1 thereupon begins to drop to steps S6 and S8 one step below, bringing about the situation as shown in FIG. 13. Herein, at about the same time, the first and third traction members 73 and 87 initially gain traction on steps S5 and S7, on which the front and rear wheel assemblies 4 and 5 had been riding. Then, with the first and third traction members 73 and 87 still adhesively in contact with the steps S5 and S7, the cart 1 continues to drop, and the front and rear wheel assemblies 4 and 5 land one step below, on steps S6 and S8 (referring to FIG. 14). Nonetheless, whereupon the first and third traction members 73 and 87 have gained traction on the steps S5 and S7, the speed of relative motion of the cart body 2 and the first and third traction members 73 and 87 is damped by the first and second oil dampers 64 and 81, retarding the dropping speed of the cart 1. Accordingly, an operator's uneasiness and apprehensiveness due to the cart 1 dropping on a descending escalator are ameliorated. Furthermore, because the impact is attenuated when the front and rear wheel assemblies 4 and 5 land one step below on steps S6 and S8, tumbling and dropping of baggage loaded the cart 1 is held in check.

A description of running the cart 1 on an ascending escalator follows.

On an ascending escalator, in the situation as shown in FIG. 15, when the front and rear wheel assemblies 4 and 5 are riding steps Sll and S12, rotation of the rear wheel assemblies 5 is checked by operating the not-shown brake mechanism, which keeps the cart 1 from slipping back-and-forth. That is, in the situation shown in FIG. 15, the cart 1, without dropping, is carried by the escalator. When the front and rear wheel assemblies 4 and 5 are riding on the middle portions tread-lengthwise of the steps S11 and S13 as shown in FIG. 15, the first and third traction members 73, 87 are grounded on the rearward portions of the steps S11, S13 on which the front and rear wheel assemblies 4 and 5 are riding, supplementing the check on back-and-forth shifting of the cart 1.

Figure 16:
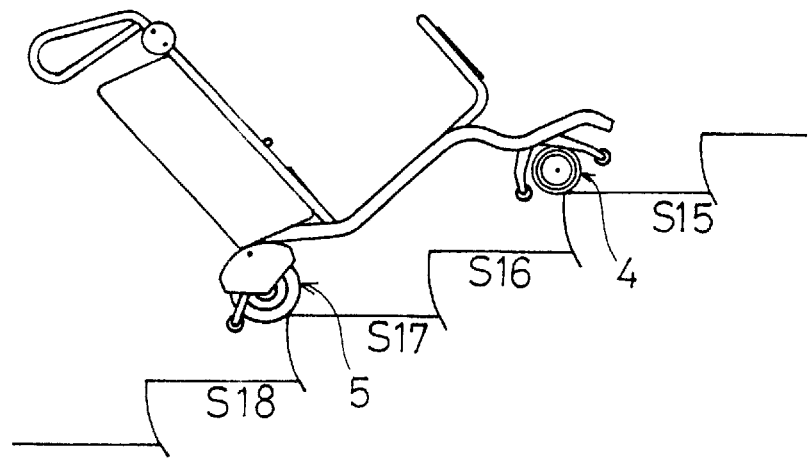
FIGS. 16–18 depict the cart alone on the ascending escalator stairway, illustrating stages of the action of the front- and rear-wheel drop attenuators.
Figure 17:
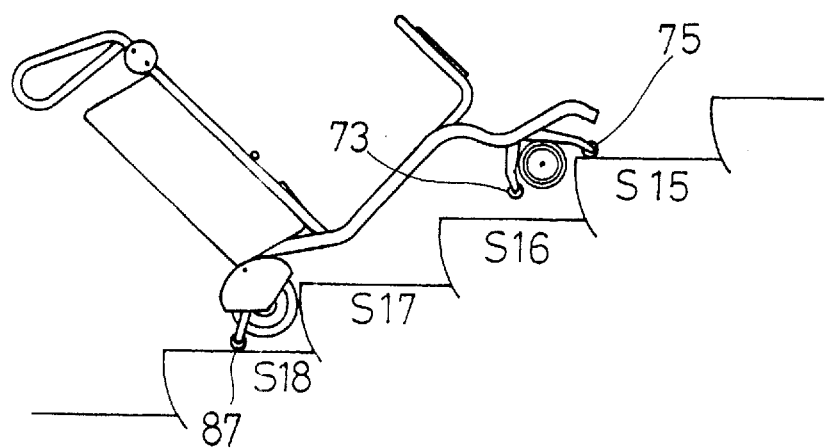
Figure 18:
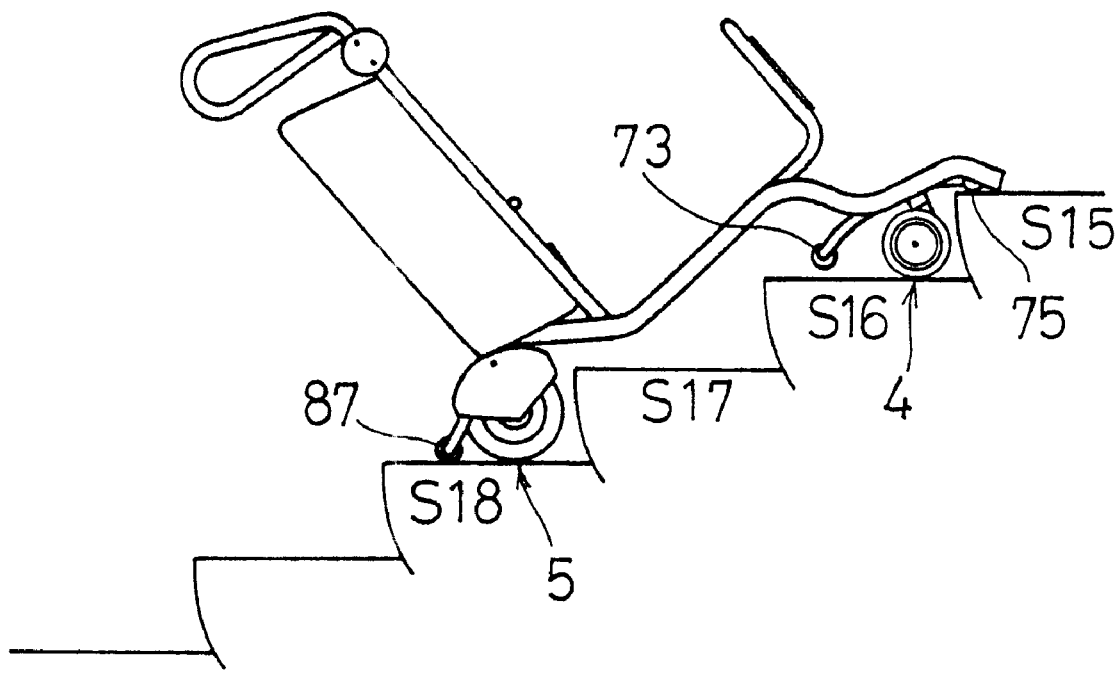

In boarding an ascending escalator wherein the front and rear wheel assemblies 4 and 5 are riding near the step-to-step breaks, when the escalator slopes, the cart 1 is brought into a situation as shown in FIG. 16. The cart 1 thereupon begins to drop to steps S16 and S18 one step below, and as shown in FIG. 17 the second traction member 75 initially gains traction on step S15. At that time, moreover, the third traction member 87 lands one step below on step S18. Then, as shown in FIG. 18, the front and rear wheel assemblies 4 and 5 land one step below, on steps S16 and S18. Nonetheless, whereupon the second traction member 75 has gained traction, the speed of relative motion of the cart body 2 and the second traction member 75 is damped by the first oil damper 64, retarding the dropping speed of the cart 1. Also, the falling speed of the rear wheel assemblies 5 and the rear portion of the cart 1 is attenuated by the second oil damper 81. Accordingly, an operator's uneasiness and apprehensiveness due to the cart 1 dropping on an ascending escalator are ameliorated; further, tumbling and dropping of baggage loaded the cart 1 is held in check.

Various details of the present invention may be changed without departing from its spirit nor its scope.

Furthermore, the foregoing description of the embodiments according to the present invention are provided for illustration only, and not for the purpose of limiting the invention as defined by the appended claims and their equivalents.

What is claimed is:

1. A pushcart for negotiating an escalator stairway of specification slope and step tread length, the pushcart comprising:

a cart body;

a plurality of wheel assemblies carrying wheels for running the pushcart on generally level surfaces, wherein at least two of said wheel assemblies each includes a fixed member fastened to said cart body;

a pivotable wheel mount holding a wheel;

a swivel joining a horizontal part of said wheel mount to said fixed member such that said wheel mount is pivotable against said fixed member about a vertical axis, whereby the at least two of said wheel assemblies are pivotable against said cart body for running the pushcart in lateral and advancing directions;

a releasable pivoting-lock mechanism for releasably locking said pivotable wheel mount in the pushcart advancing direction, said releasable pivoting-lock mechanism including an engagement member mounted on said fixed member and having a rearward notch oriented along the pushcart advancing direction, a stop formed for engagement with the rearward notch in said engagement member, and a stop retainer fixed to the horizontal part of said wheel mount for retaining said stop in contact with the wheel, wherein when the pushcart is pushed in the advancing direction, the stop is urged by frictional contact with the wheel into engagement with the rearward notch, and when the pushcart is reversed slightly against the advancing direction, the stop is urged out of engagement with the rearward notch by frictional contact with the wheel such that the wheel assembly is pivotable against said cart body; and drop attenuating mechanisms fitted to each wheel assembly, said drop attenuating mechanisms including damped-swing traction members disposed at a predetermined level-surface separation for establishing adhesive friction in contacting the treads of a sloping escalator stairway with said pivotable wheel assemblies locked in the pushcart advancing direction, wherein said traction members bear the pushcart through a damped swing if said wheel assemblies are not riding on the treads of the escalator steps.

2. A pushcart as set forth in claim 1, wherein said wheel assemblies are attached to said cart body at forward and rear positions defining a pushcart wheel base approximately equal to an integral multiple of the specification step tread length of an escalator.

3. A pushcart as set forth in claim 1, wherein said drop attenuating mechanisms comprise damping means connected to said traction members for damping said traction members through a swing approximately equal to the specification slope of the escalator.

4. A pushcart for negotiating an escalator stairway of specification slope and step tread length, the pushcart comprising:

a cart body;

a support plate attached front-endward to and underneath said cart body, for carrying at least one front wheel assembly;

a front wheel assembly fixed to said support plate;

a symmetrically opposed pair of pivotable rear wheel assemblies each including a stationary plate attached rear-endward to and underneath said cart body, a pivotable wheel mount joined to said stationary plate and having flanking plates holding a wheel, said rear wheel assemblies therein being fully pivotable against said cart body for running the pushcart in lateral and advancing directions, and a releasable pivoting-lock mechanism fitted to said stationary plate, said releasable pivoting-lock mechanism configured for releasably unidirectionally locking said pivotable wheel mount;

a front drop-attenuating mechanism including a shaft carried at either end by shaft-carrying members fixed to said support plate, a first pair of arms mounted to either end of said shaft, a first traction member held between said first arms, a second pair of arms gear-meshed with said first pair of arms and mounted to said support plate, a second traction member held between said second arms, said first and second traction members therein straddling said front wheel assembly and being disposed at a predetermined level-surface separation, and at least one dashpot mounted between said support plate and said shaft; and a rear drop-attenuating mechanism fitted to each of said pair of rear wheel assemblies, each said rear drop-attenuating mechanism including a pair of third arms pivotably mounted to said flanking plates, a third traction member held between said third arms, and a dashpot mounted between one of said third arms and said flanking plates; wherein said front and said rear drop-attenuating mechanisms establish adhesive friction in contacting the treads of a sloping escalator stairway with said pivotable rear wheel assemblies locked in the pushcart advancing direction, said traction members therein bearing the pushcart through a damped swing if said wheel assemblies are not riding on the treads of the escalator steps.

* * * * *